United States Patent [19]

Mizukami et al.

[11] Patent Number: 5,444,740
[45] Date of Patent: Aug. 22, 1995

[54] A TERNARY SIGNAL TRANSMISSION CIRCUIT AND METHOD

[75] Inventors: Masao Mizukami, Yokohama; Nobuaki Kanazawa, Akishima, both of Japan

[73] Assignees: Hitachi, Ltd., Tokyo; Hitachi Communication Systems, Inc., Kanagawa, both of Japan

[21] Appl. No.: 116,691

[22] Filed: Sep. 3, 1993

[30] Foreign Application Priority Data

Sep. 18, 1992 [JP] Japan .................. 4-275115

[51] Int. Cl.[6] .................. H04L 25/34; H04L 25/49; H04B 3/00
[52] U.S. Cl. .................. 375/286; 375/257
[58] Field of Search .................. 375/17, 36; 307/357, 307/260, 270, 473; 341/56; 328/115

[56] References Cited

U.S. PATENT DOCUMENTS

| | | | |
|---|---|---|---|
| 4,084,069 | 4/1978 | Looschen | 375/17 |
| 4,280,221 | 7/1981 | Chun et al. | 375/17 |
| 4,282,601 | 8/1981 | Flora | 375/17 |
| 4,408,189 | 10/1983 | Betts et al. | 375/17 |
| 4,528,550 | 7/1985 | Graves et al. | 375/17 |
| 4,897,854 | 1/1990 | Harris et al. | 375/17 |
| 5,111,080 | 5/1992 | Mizukami et al. | 307/475 |

FOREIGN PATENT DOCUMENTS

8002092  10/1980  .

OTHER PUBLICATIONS

Gabara, T. J., et al. "High Speed, Low Power CMOS Transmitter-Receiver System," Proceedings of the 1988 International Conference on Computer Design: VLSI in Computers and Processors—ICCD Oct. 3-5, 1988, pp. 344-347.
Yoneda, Takashi, et al. "An ECL Compatible Full CMOS 210Mbps Crosspoint Switch," IEEE Custom Integrated Circuits Conference, May 1989, pp. 10.7.1 through 10.7.4.
Gabara, Thaddeus J., et al. "High Speed, Low Power CMOS Transmitter-Receiver System," International Conference on Computer Devices, Oct. 3-5, 1988, pp. 344-347.

Primary Examiner—Stephen Chin
Assistant Examiner—Tesfaldet Bocure
Attorney, Agent, or Firm—Fay, Sharpe, Beall, Fagan, Minnich & McKee

[57] ABSTRACT

A signal transmission system provides stable, fast, long-range transmission. During transmission, a short-width pulse is synchronized with rising and falling edges of a transmission pulse signal. A ternary output signal in a differential shape is produced on the basis of the pulse, and an output signal is transmitted through series resistors via a pair of transmitting wirings. During reception, a reception terminal is provided with terminal resistors corresponding to a characteristic impedance of the transmitting wirings. A signal having passed through one of the transmitting wirings is detected with reference to a signal having passed through the other transmitting wiring. A signal having passed through the other transmitting wiring is detected with reference to the signal having passed through the one transmitting wiring. Additionally, the original pulse signal is restored and reproduced on the basis of the detected signals. The signals to be transmitted through the paired transmitting wirings are bipolar pulses or differential pulses which are generated only at the rising and falling times of the pulse signal to be transmitted. The pulses are given a complementary transmission waveform having a small amplitude divided by the series resistors at the transmission side and the terminal resistors at the reception side. In consideration of the above, and since the signals containing no-DC component can be transmitted, the charging and discharging phenomena of the inter-line capacities and the DC shift can be eliminated to accomplish long-range transmissions at a high speed.

10 Claims, 9 Drawing Sheets

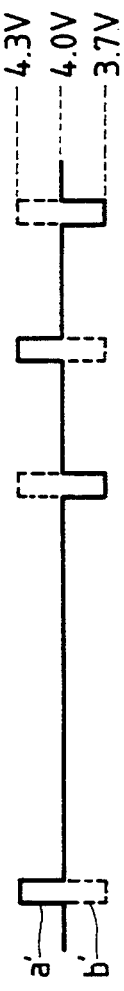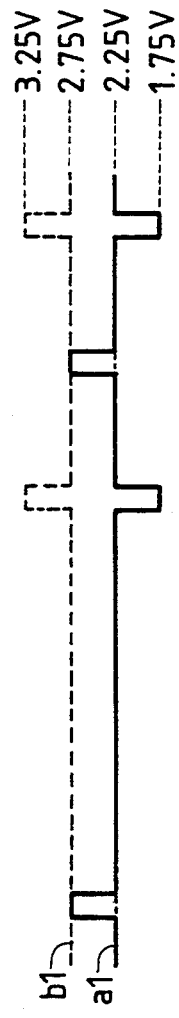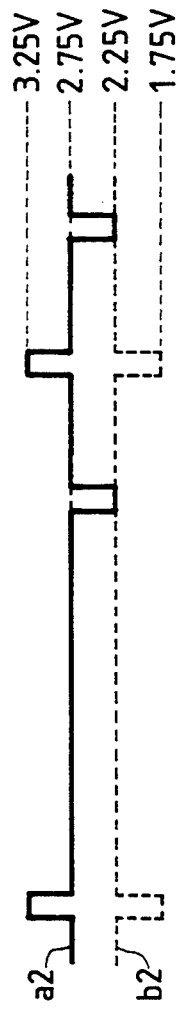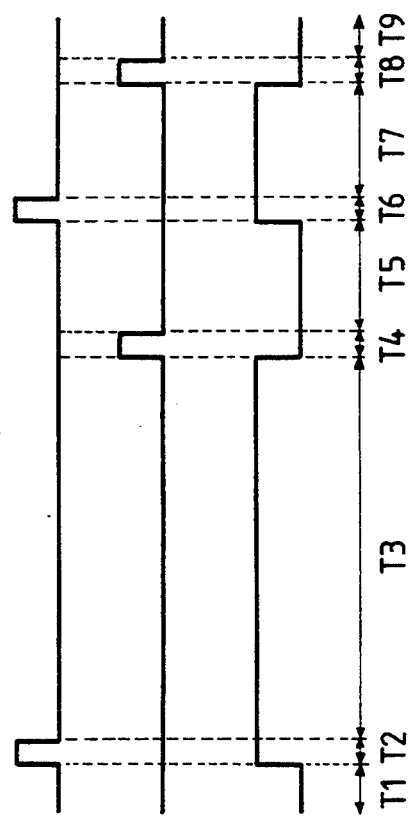
FIG. 5(a)
FIG. 5(b)
FIG. 5(c)
FIG. 5(d)

A TERNARY SIGNAL TRANSMISSION CIRCUIT AND METHOD

BACKGROUND OF THE INVENTION

The present invention relates to a signal transmitting method and a signal transmitting circuit and, more particularly, to a technology which is effective if applied to the signal transmitting method and circuit between either the digital processors constructed to include CMOSes (i.e., Complementary MOSes) or their functional blocks.

A method of transmitting signals at a high speed between the digital circuits constructed of semiconductor integrated circuit devices is exemplified by the ECL (i.e., Emitter Coupled Logic) interface method for transmissions with a small signal amplitude of 0.8 V. Another example of signal transmissions with such a small amplitude while using the CMOS circuit is disclosed on pp. 10.7.1 to 10.7.4 of papers of "CICC (i.e., Custom Integrated Circuit Conference)", May, 1989. Some method of transmitting signals of small amplitude uses no ECL level. This is disclosed on pp. 344 to 347 of papers of "ICCD (i.e., International Conference on Computer Devices)", on Oct. 3 to 5, 1988.

SUMMARY OF THE INVENTION

As the fine manufacturing technology of semiconductor elements progresses, the CMOS circuit has its operation speed and integration increased to provide an accordingly high performance in the semiconductor chip. However, there has been still left slow the operation speed of the transmitting circuit which connects either the digital devices constructed of semiconductor integrated circuit devices or their functional blocks. This delay is caused by the fact that the CMOS circuit has a low current drivability so that it essentially has a long signal transmission delay time in a high capacitive load. Therefore, the digital integrated circuit using the CMOS circuit generally adopts the method of transmitting signals to cables (or transmitting wirings) through bipolar ICs having a high drivability by arranging the bipolar ICs around the digital integrated circuit. According to this method, however, the number of parts is increased, and several kinds of power supplies are required so that the cost is accordingly raised.

The CMOS circuit of the ECL interface type using no bipolar IC in the outside is complicated because of the level change from the CMOS level to the ECL level and requires an accurate reference voltage. On the other hand, the latter method of the small amplitude transmission for transmitting differential waveforms of output signals requires a power supply of VDD/2 for an operating voltage VDD. Specifically, the transmitting wirings have their two ends connected with terminal resistors having small resistances so that a high DC current will flow if the voltage of VDD/2 is produced by a voltage dividing circuit. This makes it necessary to separately provide a power circuit having a low output impedance for producing the voltage.

An object of the present invention is to provide a signal transmitting method and a signal transmitting circuit for realizing stable fast transmissions in a long range with a simple construction.

Another object of the present invention is to provide a signal transmitting method and a signal transmitting circuit for realizing the fast transmission while reducing the power consumption.

The aforementioned and other objects and novel features of the present invention will become apparent from the following description to be made with reference to the accompanying drawings.

A representative of the invention to be disclosed will be summarized in the following. Specifically, at a transmission side, a pulse having a short pulse width synchronized with the rising edge and falling edge of a pulse signal to be transmitter is generated. A ternary output signal in a differential shape is produced on the basis of said pulse and is transmitted through series resistors via a pair of transmitting wirings. At a reception side, on the other hand, a reception terminal is provided with terminal resistors corresponding to the characteristic impedance of said transmitting wirings. The signal having passed through one of said transmitting wirings is detected with reference to the signal having been transmitted through the other transmitting wiring; the signal having passed through the other transmitting wiring is detected with reference to the signal having been transmitted through said one transmitting wiring. The original pulse signal is restored and reproduced on the basis of the detected signals.

According to the above-specified means, the following operations are obtained. The signals to be transmitted through the paired transmitting wirings are bipolar pulses (or differential pulses) which are generated only at the rising and falling times of the pulse signal to be transmitted and which are given the complementary transmission waveforms having a small amplitude divided by the series resistors at the transmission side and the terminal resistors at the reception side, so that the power consumption at the transmission side at the signal transmitting time is reduced at the same time. Moreover, since no DC component by the signal pattern is contained in the transmission signal waveforms, the charging and discharging phenomena of the inter-line capacities can be minimized even in the signal transmitting wirings of a long range. Because of no DC shift, the discrimination level is stabilized at the receiving circuit side so that the transmissions can be accomplished at a high speed in a long range.

BRIEF DESCRIPTION OF THE DRAWINGS

FIGS. 5(a) to 5(d) are waveform charts for explaining one example of the operations of the unit circuit UBI shown in FIG. 4;

DETAILED DESCRIPTION OF THE PREFERRED EMBODIMENTS

Figure 8:
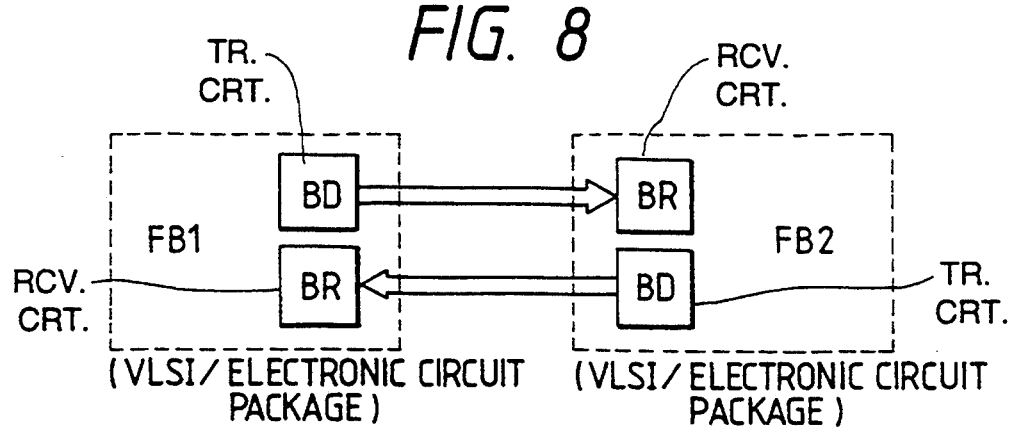
FIG. 8 is a fundamental block diagram showing one embodiment of the digital signal processor using the signal transmitting method according to the present invention.

FIG. 8 is a fundamental block diagram showing one embodiment of a digital signal processor (digital signal transmitting system) using a signal transmitting method according to the present invention.

The digital signal processor (digital signal transmitting system) of this embodiment is constructed to include two functional blocks FB1 and FB2 so that it may transfer signals for its digital signal processing between the functional blocks FB1 and FB2. For this mutual transfer of signals, the functional blocks FB1 and FB2 are equipped with signal transmitting circuits (or drivers) BD and signal receiving circuits (or receivers) BR. The signal transmitting circuit BD of the functional block FB1 or FB2 is correspondingly connected with the signal receiving circuit BR through transmitting wirings. These signal transmitting wirings are provided to correspond to a plurality of signals to be transmitted, so that the signal transmitting circuits and the signal receiving circuits are individually constructed of corresponding signal transmitting and receiving unit circuits. Each of the functional blocks FB1 and FB2 is constructed of an electronic circuit package in which one or more semiconductor integrated circuit devices of VLSI or the like are packaged in a packaging substrate such as a printed board.

Figure 1:
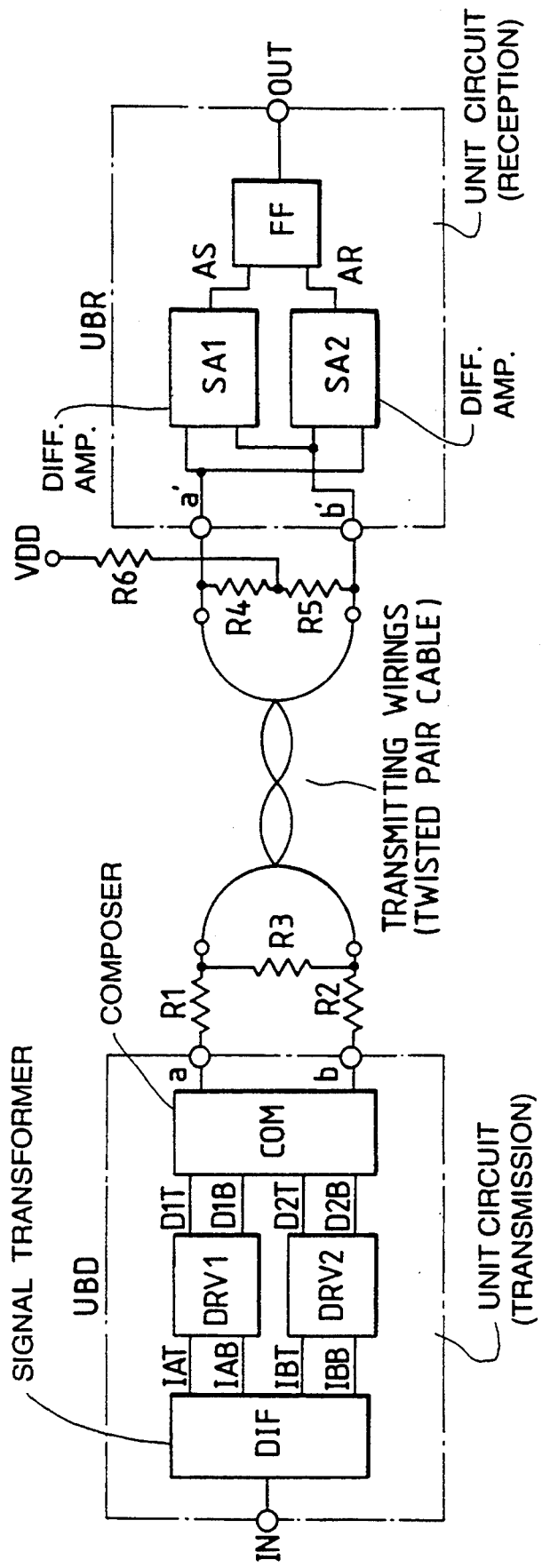
FIG. 1 is a block diagram showing one embodiment of a unit circuit of a pair of signal transmitting circuit and signal receiving circuit in the digital signal processor of FIG. 8.

FIG. 1 is a block diagram showing one embodiment of unit circuits UBD and UBR contained individually in the paired signal transmitting circuits (or drivers) and signal receiving circuits (or receivers) BR in the digital signal processor.

The unit circuit UBD at the transmission side is composed of the following circuits. This unit circuit UBD is made receptive of an input signal (original pulse signal) IN to be transmitted, which is produced by a not-shown internal circuit. This input signal IN is an NRZ (i.e., Non-Return to Zero) signal, although it is not especially limitative thereto, and is transformed by a signal transformer DIF into signals IAT and IAB, and IBT and IBB having a short pulse width corresponding to the rising and falling edges of a pulse signal.

The signal IAT is a non-inverted signal (or a true signal or first pulse) taking a high level in synchronism with the rising edge of the pulse signal, and the signal IAB is an inverted signal (i.e., a bar signal or first inverted pulse) taking a low level in response to the rising edge of the pulse signal. The signal IBT is a non-inverted signal (or a true signal or second pulse) taking a high level in synchronism with the falling edge of the pulse signal, and the signal IBB is an inverted signal (i.e., a bar signal or second inverted pulse) taking a low level in response to the falling edge of the pulse signal.

A driver DRV1 produces differential outputs D1T and D1B in response to the complementary signals IAT and IAB. A driver DRV2 produces differential outputs D2T and D2B in response to the complementary signals IBT and IBB.

A composer COM composes the four signals D1T and D1B, and D2T and D2B to produce differential ternary signals (first and second ternary output signals) a and b. These signals a and b are in complementary relationships and are outputted through a pair of signal transmitting wirings. These signal transmitting wirings are individually equipped with series resistors R1 and R2. These wirings are further equipped with a resistor R3 in parallel. This resistor R3 is an impedance matching resistor for absorbing the signal components which are reflected from the receiving ends of the transmitting wirings. These transmitting wirings are constructed of cables which are bundler of a plurality of pairs of twisted lines (or two paired lines) used widely for connecting electronic circuit packages.

The transmitting lines are equipped at their terminals, i.e., at the input terminals of the unit circuit UBR at the reception side with terminal resistors R4 to R6 which match the characteristic impedance of the transmitting wirings. In this embodiment, the resistors R4 and R5 are connected in series between the two signal lines, and the resistor R6 is connected between their intermediate point and a supply voltage VDD.

Signals a' and b' having been transmitted through the transmitting wirings are signals having the small amplitudes of voltages, which are divided by the terminal resistors R4 to R6 and the series resistors R1, R2 and R3 at the transmission side. Strictly speaking, the signals a' and b' have their signal levels determined by the conductances of later-described output MOSFETs (i.e., Metal-Oxide Semiconductor Field Effect Transistors) and by the distributed resistances of the transmitting wirings. In case the output signal is a current source, its drive current determines the signal amplitude on the transmitting wirings.

The unit circuit at the reception side for receiving the transmitted signals having the small amplitudes is equipped with differential amplifiers SA1 and SA2 of high input impedances. In this embodiment, the differential amplifiers SA1 and SA2 are provided in parallel for discriminating differential ternary inputs. Of these, the differential amplifier SA1 discriminates and restores the received signal corresponding to a signal IA corresponding to the rising edge of the pulse signal, and the differential amplifier SA2 discriminates and restores the received signal corresponding to a signal IB corresponding to the falling edge of the pulse signal.

A flip-flop FF is set on the basis of the output signal of the differential amplifier SA1 and is reset on the basis of the output signal of the differential amplifier SA2. This flip-flop FF restores the pulse signal corresponding to the NRZ and outputs it from an output terminal OUT. In the same Figure, the transmitting wirings transmit the so-called "differentiated ternary differential signals" containing no fluctuation of the DC components depending upon the signal pattern so that they can accomplish the transmissions of a long range of 10 m or more at a high speed.

Figure 2:
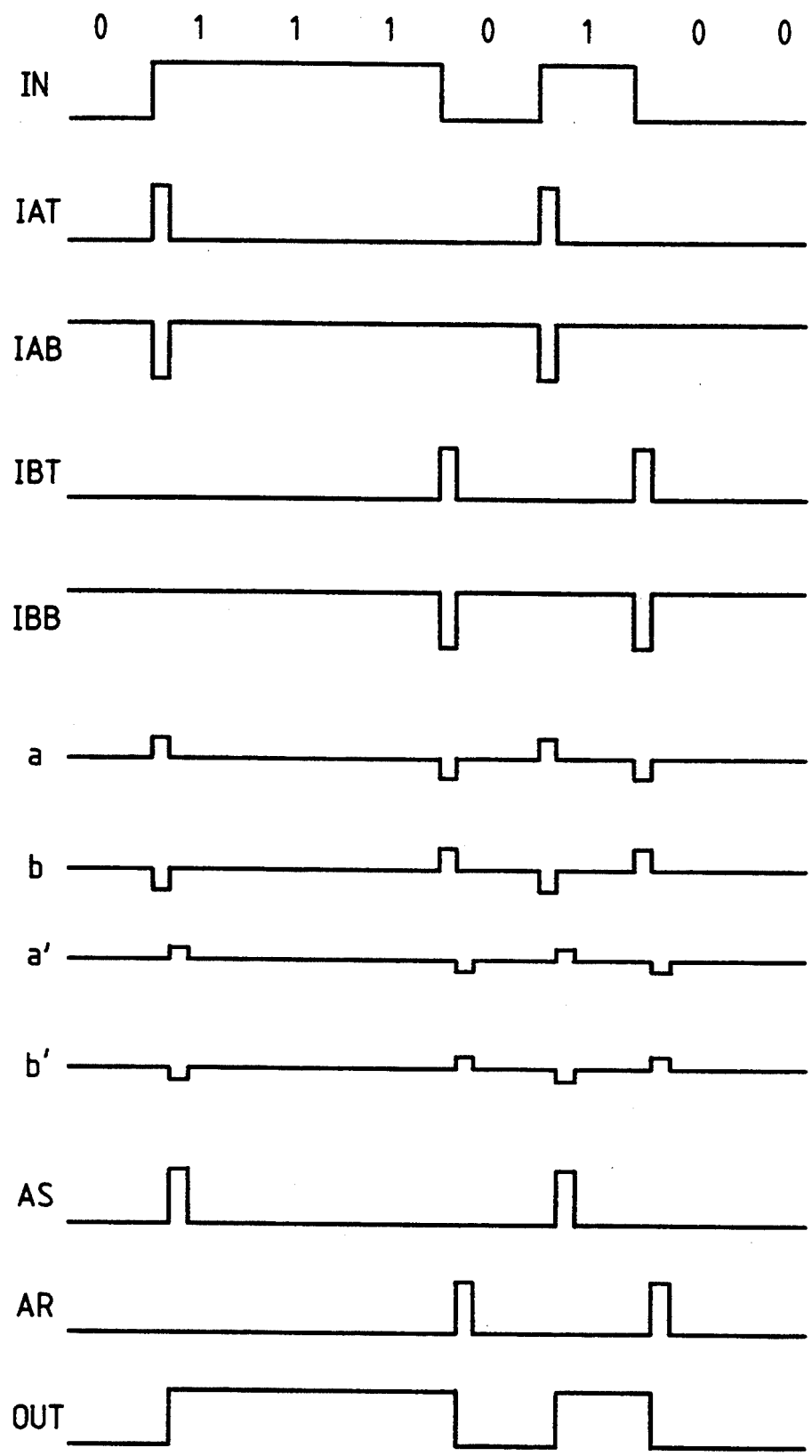
FIG. 2 is a waveform chart for explaining the operations of the embodiment circuit of FIG. 1.

FIG. 2 is a waveform chart for explaining the operations of the embodied circuit of FIG. 1.

The input signal (original pulse signal) IN is produced by an internal CMOS circuit so that it is a pulse signal to be fully swung between a high level such as the supply voltage VDD and a low level such as the earth potential of the circuit.

The signal transformer DIF made receptive of the input signal IN produces the signals IAT and IAB synchronized with the rising edge of the input signal IN and the signals IBT and IBB synchronized with the falling edge. The drivers DRV1 and DRV2 produces four synchronized complementary signals. On the basis of these signals, the output signal a is transformed by the composer COM into a ternary signal having values 0 as a non-signal, +1 as corresponding to the signal IAT and −1 as corresponding to the signal IBT. On the contrary, the output signal b is a ternary signal having values 0 as a non-signal, −1 as corresponding to the signal IAB and +1 as corresponding to the signal IBB.

These signals (first and second -ternary output signals) a and b are transmitted to the reception side through the transmitting wirings so that they are delayed as the received signals a' and b' by the propagation time of the transmitting wirings. The differential amplifier SA1 senses the high/low levels of the signal a' with reference to the signal b' so that it produces the output signal (first detecting signal) AS corresponding to the transmission side signal IAT. On the contrary, the differential amplifier SA2 senses the high/low levels of the signal b' with respect to the signal a' so that it produces the output signal (second detecting signal) AR corresponding to the transmission side signal IBT.

The flip-flop FF is set by the input of the signal AS to raise the output signal OUT to the high level and is reset by the input of the signal AR to drop the output signal OUT to the low level. As a result, the output signal OUT is restored to the pulse signal of the NRZ corresponding to the input signal (original pulse signal) IN.

Figure 3:
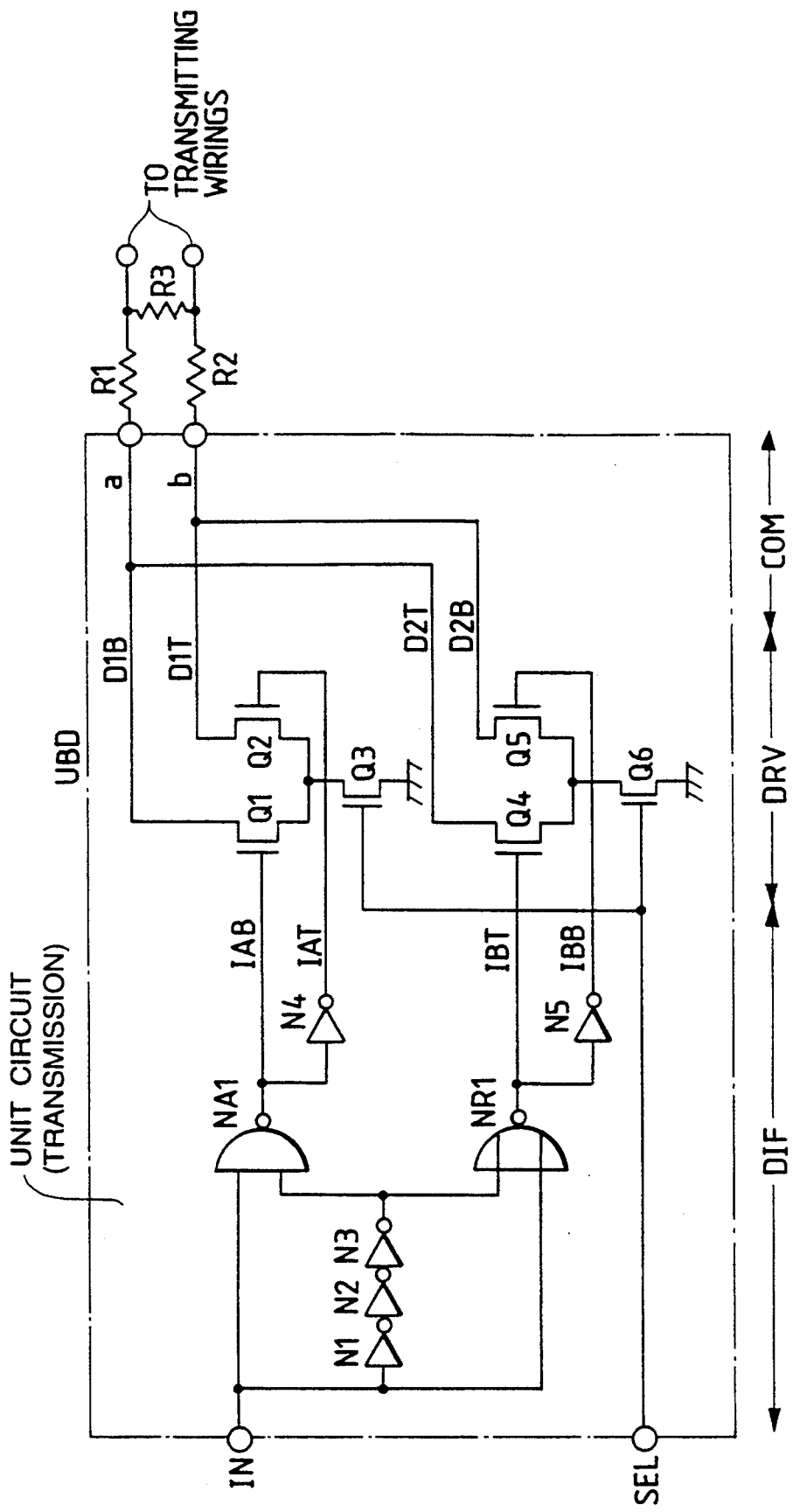
FIG. 3 is a circuit diagram showing one embodiment of the unit circuit UBD at the transmission side.

FIG. 3 is a circuit diagram showing one embodiment of the unit circuit (signal transmitting circuit) UBD at the transmission side. This unit circuit UBD is formed together with a digital signal processor for packaging the former, over a single semiconductor substrate of single crystal silicon or the like by the well-known semiconductor integrated circuit manufacturing technology.

The signal transformer DIF makes use of the delay time of inverters (first and second delay means) N1 to N3 in a cascade connection to produce the signal IAB, which is synchronized with the rising edge of the input signal (original pulse signal) IN and has a short pulse width corresponding to the delay time, and the signal IBT, which is synchronized with the falling edge and has a short pulse width corresponding to the delay time, by a NAND gate circuit (first logical gate means) NA1 and a NOR gate circuit (second logical gate means) NR1.

The signal IAB is the bar signal which takes the low level in synchronism with the rising edge of the input signal IN. This bar signal is fed to an inverter N4 to produce the true signal IAT which takes the high level in synchronism with the rising edge. On the other hand, the signal IBT is the true signal which takes the high level in synchronism with the falling edge of the input signal IN. This true signal is fed to an inverter N5 to provide the bar signal IBB which takes the low level in synchronism with the falling edge.

The pairs of complementary signals IAT and IAB, and IBT and IBB described above are fed to the gates of differential MOSFETs Q1 and Q2, and Q4 and Q5 constituting a driver DRV. These differential MOSFETs Q1 and Q2, and Q4 and Q5 are equipped at their source sides with MOSFETs Q3 and Q6 acting as constant current sources. In order to establish an output high-impedance state, those MOSFETs Q3 and Q6 have their gates fed with a signal SEL acting as a control signal and a constant voltage, although not especially limitative thereto. Specifically, when the signal SEL is at the low level, the MOSFETs Q3 and Q6 are turned OFF so that the output high-impedance state is established independently of the complementary signals IAT and IAB, and IBT and IBB. When the signal SEL is at the high level, the MOSFETs Q3 and Q6 are turned ON to produce a constant current thereby to output current signals corresponding to the complementary signals IAT and IAB, and IBT and IBB.

The signal composer is realized by the wired-OR constructed. Specifically, of the two pairs of differential NOSFETs Q1 and Q2, and Q4 and QS, the MOSFETs Q1 and Q4 have their drains commonly connected with the terminal a. The remaining MOSFETs Q2 and Q5 have their drains commonly connected with the terminal b. As a result, when the input signals are unchanged at the high or low level, the signals IAB and IBB take the high level so that the MOSFETs Q1 and Q5 are turned ON. Then, a constant current is produced by the MOSFET Q3 and is fed to the terminal a through the MOSFET Q1, and a constant current is produced by the MOSFET Q6 and is fed to the terminal b through the MOSFET QS. If the constant currents produced by the MOSFETs Q3 and Q6 are designated at I, the terminals a and b are fed with the constant current I.

Synchronously as the input signal IN is raised to the high level, the signal IAT is changed to the high level whereas the signal IAB is changed to the low level, so that the differential MOSFET Q1 is turned OFF whereas the differential MOSFET Q2 is turned ON. As a result, the constant current produced by the MOSFET Q3 is fed to the terminal b through the MOSFET Q2 so that the current to flow to the terminal b takes the value of 2I without any current flow to the terminal a. As a result, the terminals a and b take such voltage levels that the terminal b takes a minus potential whereas the terminal a takes a positive terminal, as shown in the waveform chart of FIG. 2, if the voltages levels are assumed to be at 0 when the current I flows.

Synchronously as the input signal IN is broken to the low level, the signal IBT is changed to the high level whereas the signal IBB is changed to the low level, so that the differential MOSFET Q5 is turned OFF whereas the differential MOSFET Q4 is turned ON. As a result, the constant current produced by the MOSFET Q6 is fed to the terminal a through the MOSFET Q4 so that the current to flow to the terminal a takes the value of 2I without any current flow to the terminal b. As a result, the terminals a and b take such voltage levels that the terminal a takes a minus potential whereas the terminal b takes a positive terminal, as shown in the waveform chart of FIG. 2, if the voltages levels are assumed to be at 0 when the current I flows. Incidentally, the delay time by the inverters N1 to N3 is shorter than the period for which the unput signal IN is at the high level after it has arisen to the high level and before it falls again to the low level. As a result, the signals IAB and IBB have returned to the high level before the input signal IN falls to the low level. Moreover, since the delay time of the inverters (first and second delay means) N1 to N3 is shorter than the period for which the input signal IN is at the low level, the signals IAB and IBB have returned to the high level before the input signal IN arises from the low level to the high level.

The operations will be described from the standpoint of drive currents. If the state in which the current I without any signal is flowing is assumed to 0, as described above, the current outputs are in such a ternary differential mode that the current −I flows to the terminal a whereas the current +I flows to the terminal b when the input signal IN arises, and that the current +I flows to the terminal a whereas the current −I flows to the terminal b when the input signal IN falls. On the other hand, the sum of the currents flowing through the terminals a and b is always constant at 2I.

Figure 4:
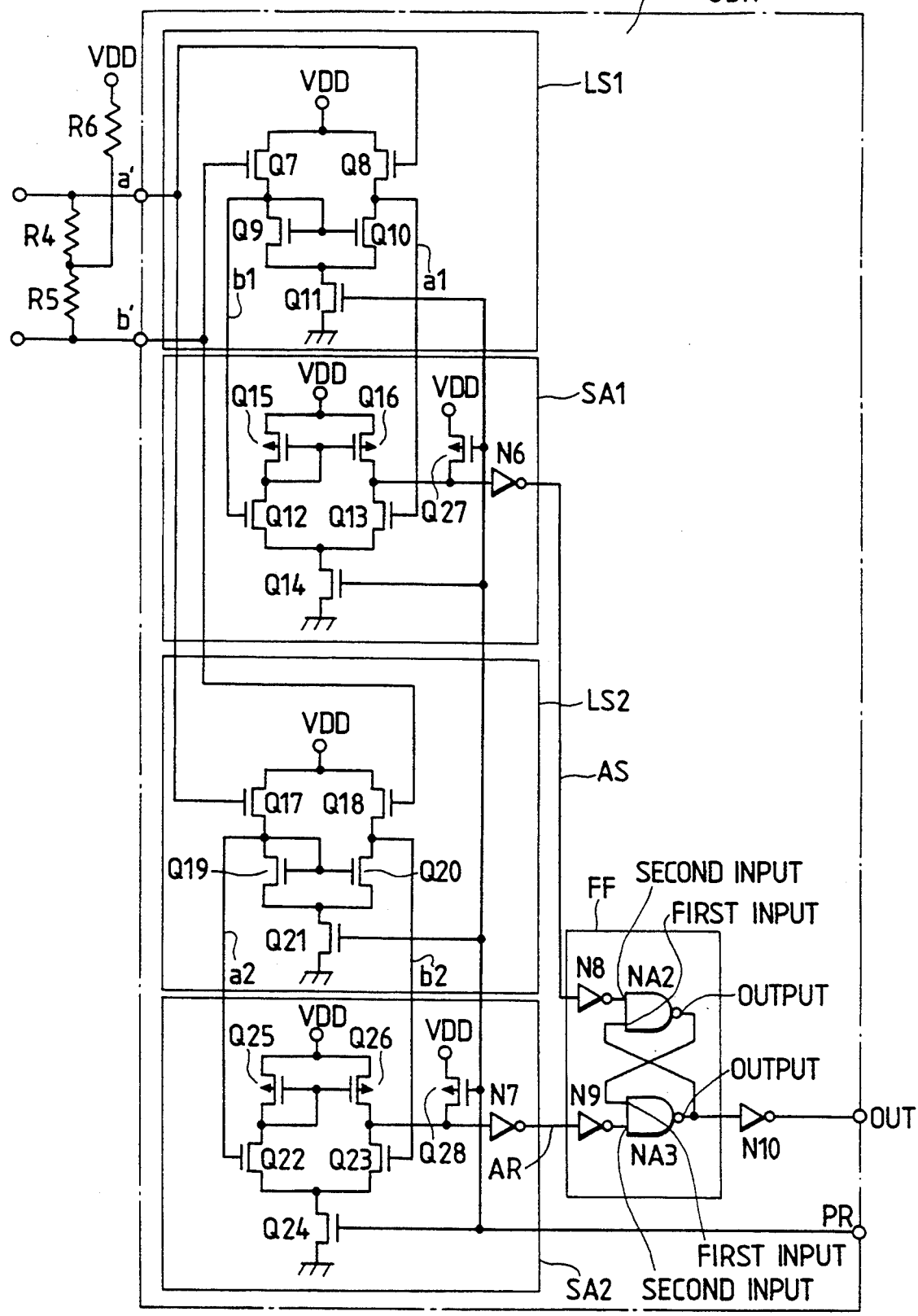
FIG. 4 is a circuit diagram showing one embodiment of the unit circuit UBR at the reception side.

FIG. 4 is a circuit diagram showing one embodiment of the unit circuit (signal receiving circuit) UBR at the reception side. This unit circuit UBR is formed together with the digital signal processor or the data processor for packaging it over one semiconductor substrate of single crystal silicon or the like by the well-known semiconductor integrated circuit manufacturing technology. If the digital signal processor is given the transmitting and receiving functions, the unit circuit UBD at the transmission side is also packaged over the same chip (as shown in FIG. 8).

In order to receive the ternary differential signals having the small amplitudes, the reception side unit circuit UBR is constructed to include level shifter (first and second level shift means) LS1 and LS2 of high input impedances and differential amplifiers (frist and second sensing means) SA1 and SA2 of high sensitivities. The level shifter (first level shift means) LS1 is constructed of a load circuit which includes N-channel MOSFETs Q7 and Q8 made receptive of the signals a′ and b′ and N-channel MOSFETs Q9 and Q10 in a current mirror shape at the source side of the former. The input MOSFETs Q7 and Q8 constituting the level shifter LS1 have their drains connected with the supply voltage VDD. The N-channel MOSFETs Q9 and Q10 in the current mirror shape constituting the load circuit have their sources fed with the ground potential through an N-channel type switch MOSFET Q11 so that they may be sufficed with a low power.

The reason why the level shifter LS1 disposed at the input portion of the reception side unit circuit UBR, as described above, is to match the transmitting wirings with the terminal resistances only. This is because the terminal matching of the transmitting wirings becomes difficult if the input impedance at the receiving circuit side has an impedance. On the other hand, the reason why the level shifter LS1 is provided is as follows. That is to say, the levels of the input signals a′ and b′, which are given the small amplitudes by the division of the resistors, as described above, are so drastically biased toward the supply voltage VDD that the differential amplifier SA1 for sensing them are disabled to amplify them directly. In other words, the level shifter LS1 causes the differential ternary input signals a′ and b′ biased toward the supply voltage VDD to be amplified in the most sensitive region of the differential amplifier SA1, as will be described in the following.

The differential amplifier (first sensing means) SA1 is constructed to include: a pair of N-channel differential MOSFETs Q12 and Q13 having their gates fed with the complementary input signals b1 and a1 which have their levels shifted by the level shifter LS1, an active load circuit composed of P-channel MOSFETs Q15 and Q16 in the current mirror shape disposed at the drains of the amplifying MOSFETs Q12 and Q13, N-channel type power switch MOSFET Q14 disposed at the sources of the differential amplifying MOSFETs Q12 and Q13 and inverter circuit coupled to the drain of the amplifying MOSFET Q13.

Although not especially limitative, the power switch MOSEET Q11 of the level shifter LSI and the power switch MOSFET Q14 of the differential amplifier SA1 are turned ON when the reception side unit circuit UBR is activated by the high level of a switch control signal PR. When the unit circuit UBR is in active, a steady DC current can be prevented from flowing in the level shifter LS1 and the differential amplifier SA1 if the signal PR is dropped to the low level to turn OFF the MOSFETs Q11 and Q14.

The differential amplifier SA1 has its output signal outputted through inverters N6. In order that the inverter N6 may be prevented from taking an unstable level by dropping the signal PR to the low level to inactivate the differential amplifier SA1, a P-channel type pull-up MOSFET Q27 for receiving the signal PR is connected between the input terminal of the inverter N6 and the supply voltage VDD. As a result, when the signal PR is at the low level, the P-channel MOSFET Q27 can be turned ON to fix the input signal of the inverter N6 at the high level such as the supply voltage VDD. As a result, the DC current can be presented from flowing into the inverter N6 by setting the input signal of the inverter N6 to the unstable level.

Both the sense amplifier SA2 connected with the sense amplifier SA1 and the level shifter LS2 disposed at the front step of the sense amplifier SA2 are constructed to have circuits like the ones. However, these circuits LS2 and SA2 are used to detect the signals synchronized with the falling edge of the pulse signal IN in response to the signal IB of the transmission side unit circuit UBD so that they are made to discriminate the high/low levels of the input signal b′ with reference to the potential of the input signal a′ as contrary to the sense amplifier SA1. Thus, the level shifter LS2 and the differential amplifier SA2 are similar to the level shifter LS1 and differential amplifier SA1 excepting their inverted input connections, and their description will be omitted. The sense amplifier SA2 thus described has its output signal outputted through inverters N7.

The flip-flop (reproducing means) FF is constructed to include two-input NAND gate circuits NA2 and NA3 and the inverters N8 and N9. The NAND gate circuit NA2 has its output coupled to the first input of the NAND gate circuit NA3, which in turn has its output coupled to the first input of the NAND gate circuit NA2. In short, the NAND gate circuits NA2 and NA3 are cross-connected with each other. The NAND gate circuit NA2 has its second input coupled to the output of the sense amplifier SA1 through the inverter N8. As a result, the inverted signal of the output signal (i.e., the set signal AS) outputted by the sense amplifier SA1 is inputted to the second input of the NAND gate circuit NA2. On the other hand, the NAND gate circuit NA3 has its second input coupled to the output of the sense amplifier SA2 through the inverter N9. As a result, the inverted signal of the output signal (i.e., the reset signal AR) outputted of the sense amplifier SA2 is inputted to the second input of the NAND gate circuit NA3. This NAND gate circuit NA3 has its output used as the output of the flip-flop FF. The output signal fed from the output of this flip-flop FF is fed to the output terminal OUT through the inverter N10.

Here will be described the operations of the flip-flop FF with reference to FIG. 5(d). First of all, it is assumed, as shown at T1 in FIG. 5(d), that the output signal of the flip-flop FF has the high level whereas the output signal outputted from the output terminal OUT has the low level. The flip-flop FF is fed with the set signal AS and the reset signal AR at the low level from the sense amplifiers SA1 and SA2. As a result, the signal at the high level is inputted to the second inputs of the NAND gate circuits NA2 and NA3 respectively through the inverters N8 and N9. The NPND gate circuit NA2 has its first and second inputs fed steadily with the high-level signal. As a result, the NAND gate circuit NA2 outputs the low-level output signal steadily. On the other hand, the NAND gate circuit NA3 has its first input fed steadily with the low-level signal and its second input fed steadily with the high-level signal. As a result, the NAND gate circuit NA3 outputs the low-level signal steadily. Thus, the output terminal OUT outputs the low-level signal steadily through the inverter N10.

It is assumed in the state of the flip-flop FF described above (as shown at T2 in FIG. 5(d)) that the sense amplifier SA1 feeds the flip-flop FF with the high-level output signal (i.e., the set signal) whereas the sense amplifier SA2 feeds the flip-flop FF with the low-level signal (i.e., the reset signal).

At this time, the low-level signal is fed to the second input of the NAND gate circuit NA2 through the inverter N8. As a result, the NAND gate circuit NA2 is so changed in its state as to output the high-level output signal. This high-level signal is inputted to the first and second inputs of the NAND gate circuit NA3. As a result, the NAND gate circuit NA3 is so changed in its state as to output the low-level output signal. As a result, the flip-flop FF outputs the low-level output signal. As a result, the high-level signal is outputted to the output terminal OUT through the inverter N10.

Next, it is assumed in this state of the flip-flop FF (as shown at T3 in FIG. 5(d)) that the sense amplifier SA1 feeds the flip-flop FF with the low-level output signal (i.e., the set signal or first detecting signal) whereas the sense amplifier SA2 feeds the flip-flop FF with the low-level output signal (i.e., the reset signal or second detecting signal).

At this time, the high-level signal is inputted to the second input of the NAND gate circuit NA2 through the inverter N8. However, the NAND gate circuit NA2 has its first output fed steadily with the low-level signal so that its state is not changed.

Next, it is assumed in this state of the flip-flop FF (as shown at T4 in FIG. 5(d)) that the sense amplifier SA1 feed the flip-flop FF with the low-level output signal (i.e., the set signal) whereas the sense amplifier SA2 feeds the flip-flop FF with the high-level output signal (i.e., the reset signal).

At this time, the low-level signal is fed to the second input of the NAND gate circuit NA3 through the inverter N9. As a result, the NAND gate circuit NA3 is so changed in its state as to output the high-level output signal. As a result, the high-level signal is inputted to the first and second inputs of the NAND gate circuit NA2. As a result, the NAND gate circuit NA2 is so changed in its state as to output the low-level output signal. As a result, the flip-flop FF outputs the high-level output signal. Thus, the output terminal OUT outputs the low-level output signal through the inverter N10.

Next, it is assumed in this state of the flip-flop FF (as shown at T5 in FIG. 5(d)) that the sense amplifier SA1 feeds the flip-flop FF with the low-level output (i.e., the set signal) whereas the sense amplifier SA2 feeds the flip-flop FF with the low-level output signal (i.e., the reset signal).

At this time, the high-level signal is inputted to the second input of the NAND gate circuit NA3 through the inverter N9. However, the NAND gate circuit NA3 has its input fed steadily with the low-level signal. As a result, the NAND gate circuit NA3 is not changed in its state. The state of the flip-flop FF at this time is identical to that of the flip-flop FF, which has been assumed at first (as shown at T1 in FIG. 5(d)).

The states of the flip-flop FF for the time periods T6, T7, T8 and T9 of FIG. 5(d) are respectively identical to those of the flip-flop FF for the time periods T2, T3, T4 and T5.

Incidentally, in the description made above, it is assumed that the inverters N6 and N7 are respectively contained in the sense amplifiers SA1 and SA2 and that the inverters N8 and N9 are contained in the flip-flop FF. Despite of these assumptions, however, the inverters N6 and N8 may be connected between the sense amplifier SA1 and the flip-flop FF. Moreover, the inverters N7 and N9 may be connected between the sense amplifier SA2 and the flip-flop FF. These inverters N6 to N9 have functions to shape the signals coming from the drains of the transistors Q13 and Q23.

In this embodiment, there is constructed the VLSI which has its unit circuits UBD and UBR formed of the CMOS circuit. Therefore, the inverters N1 to N9 are constituted of the CMOS inverters.

For stable operations, in this embodiment, the level shifters LS1 and LS2 are additionally given functions to offset the differential input signals of the differential amplifiers SA1 and SA2. Specifically, the level shifting amounts are so biased that the input signals b1 and a2 of the differential amplifiers SA1 and SA2 may be slightly higher than the input signals a1 and b2 in the state of no signal. These offsets are suitably determined on condition that they are twice as large as the amplitudes of the input signals a' and b' or less. If the amplitudes of the input signal a' and b' are about several hundreds mV, for example, the offsets are accordingly set to several hundreds mV.

The offsets may be given to the inputs of the differential amplifiers SA1 and SA2 not only by the level shifters LS1 and LS2, as described above, but also by setting the conductances of the differential MOSFETs and the load MOSFETs of the differential amplifiers SA1 and SA2 suitably.

FIGS. 5(a) to 5(d) show waveform charts for explaining ore example of the operations of the unit circuit UBR shown in FIG. 4. As shown in FIG. 5(a), the signals a' and b' inputted through the transmitting wirings are the signals corresponding to the ternary differential shape. When these signals a' and b' are in the state of no signal (other than the rising or falling edge of the pulse signal transmitted), the amount (|(level of b2)−(level of b')| and |(level of b1)−(level of b')|) for the signal b' to have its level shifted is designed to be smaller than the amount (|(level of a2)−(level of a')| and |(level of a1)−(level of a')|). The input signals a1 and b1, and a2 and b2 of the differential amplifiers SA1 and SA2 have their individual offsets determined, as shown in FIG. 5(b) and FIG. 5(c), by making the level shift of the signal b', as indicated by broken lines, than the level shift of the signal a', as indicated by solid lines.

In FIG. 5(a), the specific voltage levels to be taken by the signal a' are 3.7 V, 4.0 V and 4.3 V, which correspond to the low level, the no-signal level and the high level, although not especially limitative thereto.

In FIG. 5(b) and FIG. 5(c), the specific voltage levels to be taken by the signals b1 and a2 are 2.25 V, 2.75 V and 3.25 V, which correspond to the low level, the no-signal level and the high level.

In FIG. 5(b) and FIG. 5(c), the specific voltage levels to be taken by the signals a1 and b2 are 1.75 V, 2.25 V and 2.75 V, which correspond to the low level, the no-signal level and the high level.

When the signals b1 and a1 are in the no-signal state, their potential difference is $|2.75-2.25|=0.5$ V. As a result, the sense amplifier SA1 senses the potential difference between the signals b1 and a1 inputted, to output the high-level signal to the inverter N6.

When the signals b2 and a2 are in the no-signal state, on the other hand, their potential difference is $|2.75-2.25|=0.5$ V. As a result, the sense amplifier SA2 senses the potential difference between the signals b2 and a2 inputted, to output the high-level signal to the inverter N7.

Even when the signals a1, a2, b1 and b2 are in the no-signal state, the sense amplifiers SA1 and SA2 can output the high-level output signals to the inverters N6 and N7, respectively. The latched data of the flip-flop FF are not inverted when the signals a1, a2, b1 and b2 are in the no-signal state, so that the flip-flop FF can have its operations stabilized.

As described above, when the signal a' is no signal, the level shifter LS1 produces the signal b1, which is level-shifted by 1.25 V toward the ground potential from the potential of the signal a', and the signal a1 which is level-shifted by 1.75 V toward the ground potential from the potential of the signal a'. In order to realize this production, the gate length to gate wilth ratio (i.e., W/L) of the constant current source transistor Q9 at the side of the signal b1 is set to a larger value of the gate length to gate width ratio (i.e., W/L) of the constant current source transistor Q10 at the side of the signal a1.

As a result, the differential amplifiers SA1 and SA2 are fed with the ternary signals a1 and b1, and a2 and b2 of the differential shape with the offsets when in the signal of no signal. Thus, the output signal of the differential amplifier SA1 or SA2 is not inverted, so long as any noise is superposed on one of the twisted pair lines and only in one direction, so that the external noise margin can be remarkably increased.

Like the foregoing description of FIG. 2 excepting that the offsets are determined, when a true signal arrives, the signal is discriminated and reproduced by the differential amplifier SA1 in synchronism with the rising edge of the input signal at the transmission side, and the signal is discriminated and reproduced by the differential amplifier SA2 in synchronism with the fall edge of the input signal at the transmission side.

In case the embodiment circuits shown in FIGS. 3 and 4 are to be used, the amplitudes of the signals a', and b' on the transmitting wirings are set to a level as low as 300 to 500 mV. Since the receiving circuit performs the linear amplification of differentially high sensitivity, it can restore and reproduce the signal of such low amplitude, if received, to the original signal. If the wirings have a characteristic impedance of 50 $\Omega$, it is necessary to feed a current as high as 100 mA for a full amplitude of 5 V. For the transmission signal having a low amplitude, the current may be as low as 10 mA if the transmission amplitude could be 500 mV at the highest as in this embodiment. Thus, the low amplitude transmission is highly effective for reducing the power consumption of the signal transmitting circuit.

Specifically, when a signal having a radio frequency is to be transmitted through the transmitting wirings, it is essential to provide a terminal resistor matching the characteristic impedance of the transmitting wirings. However, the twisted pair lines have a relatively low characteristic impedance so that the terminal resistor has an accordingly low resistance. As a result, if the transmitting wirings are equipped with the terminal resistors having a resistance of 100 $\Omega$, they have to be fed with a drive current as high as 50 mA so that a signal amplitude of 5 V may be transmitted.

In case the bipolar IC is used as in the prior art, it raises no serious problem to feed the drive current. However, it is impossible for the CMOS circuit to feed such a high current. In this embodiment, on the contrary, the series resistor is inserted into the output portion at the signal transmitting side, as described above, to attenuate the signal amplitude transmitted. If a resistor of 900 $\Omega$ is inserted, for example, the current to flow through the transmitting wirings can be reduced to 5 mA. As a result, one semiconductor integrated circuit device can be formed with a number of output circuits. In short, the signal transmitting system and circuit of this embodiment can achieve not only the high speed transmission, as described above, but also the reduction of the power consumption of the circuit.

Since the transmissions are carried out in the present invention by using the ternary differential signals synchronized with the rising/falling edges of the pulse signal to be transmitted, the signal pattern contains no DC fluctuation, and the discrimination at the receiving circuit can be stably effected without any DC shift to ensure transmissions of a long range of 10 m or more.

In the present invention, the transmitting wirings are equipped with the terminal resistors, and the signals are transmitted while matching the characteristic impedance so that none of the noises such as the reflections due to the mismatched impedance in the transmitting wirings is caused. Moreover, since the system adopted transmits the complementary signals by using the twisted pair lines, the noises in the common mode can be offset by the amplifications of the differential amplifiers at the signal receiving side. As a result, the signal having a small amplitude of an AC component only can be transmitted reliably at a high speed by the simple construction described above.

In the present invention, the digital circuit including the unit circuit UBD at the signal transmitting side is constructed of the semiconductor integrated circuit device. This semiconductor integrated circuit device is packaged in the electronic circuit package made of the printed board. In this electronic circuit package, there are further packaged the series resistors R1 to R3. In other words, these series resistors R1 to RS are constructed as the external parts of the semiconductor integrated circuit device.

The terminal resistors R4 to R6 included in the unit circuit UBR at the signal receiving side have their resistances given such a limited allowable range that they may match the characteristic impedance of the transmitting wirings. The resistances to be established in the semiconductor integrated circuit device are so dispersed depending upon the manufacturing process that they are unsuitable for the impedance matching. Thus, the terminal resistors R4 to R6 to be disposed at the signal receiving side are packaged in the electronic circuit package as the external parts of the semiconductor integrated circuit device to be formed with the unit circuit UBR, although not especially limitative thereto. Since the signal amplitude to be transmitted is determined by the resistance ratio between the series resistors and the terminal resistors, as described above, there arises a disadvantage that the signal amplitude to be transmitted is seriously fluctuated by the influences of the process dispersion if the series resistors R1 to R3 to be disposed at the signal transmitting side may desirably be packaged in the semiconductor integrated circuit device. Therefore, the series resistors R1 to R3 are packaged on the package substrate constituting the electronic circuit package, as described above. Thus, if the resistances of the resistance elements formed in the semiconductor-integrated circuit device can be made highly accurate by the trimming technology or the like, the resistance elements can naturally be packaged in the semiconductor integrated circuit device, too.

Figure 6:
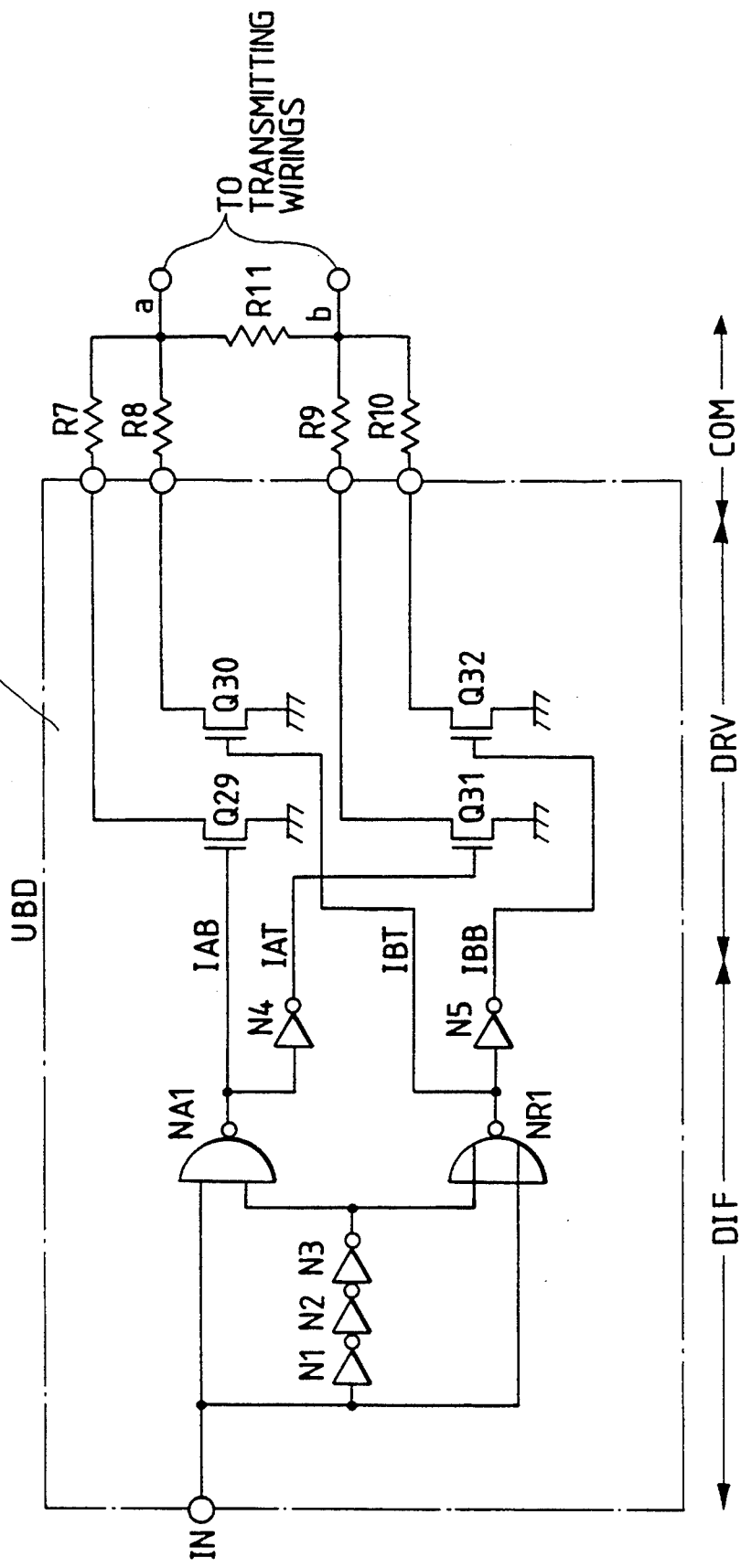
FIG. 6 is a circuit diagram showing another embodiment of the unit circuit UBD at the transmission side.

FIG. 6 is a circuit diagram showing another embodiment of the unit circuit UBD at the transmission side. This embodiment is made different from the embodiment of FIG. 3 in the driver DRV and the composer COM.

MOSFETs Q29 to Q32 are operated as constant current sources having switch functions. Specifically, the MOSFET Q29 has its gate fed with the bar signal IAB, which is produced in synchronism with the rising edge of the input signal IN, and the MOSFET Q31 has its gate fed with the true signal IAT which is produced in synchronism with the rising edge of the input signal IN. Moreover, the MOSFET Q30 has its gate fed with the true signal IBT, which is produced in synchronism with the falling edge of the input signal IN, and the MOSFET Q32 has its gate fed with the bar signal IBB which is produced in synchronism with the falling edge of the input signal IN.

The drive currents produced by the MOSFETs Q29 and Q30 are composed into the signal a through resistors R7 and R8. The drive currents produced by the MOSFETs Q31 and Q32 are composed into the signal b through resistors R9 and R11. A resistor R11 disposed in parallel with the transmitting wirings is an impedance matching resistor like the resistor R3.

By the operations of this embodiment circuit, the ternary current is produced in the following manner if the current to flow when the MOSFETs Q29 to Q32 are ON is designated at I. Without any signal, the bar signals IAB and IBB are at the high level so that the MOSFETs Q29 and Q32 are turned ON to feed the current I to the output terminals a'and b at the transmission side.

In synchronism with the rising edge of the input signal IN from the low level to the high level, the bar signal IAB is set to the low level whereas the true signal IAT is set to the high level. At this time, the MOSFET Q30 is turned OFF whereas the MOSFET Q31 is turned ON. As a result, no current flows to the output terminal a at the transmission side whereas the current of 2I flows to the output terminal b.

In the steady state with the input signal being at the high level, the bar signals IAB and IBB are raised again to the high level so that the current I flows to the two terminals a and b as above. When the input signal IN falls from that state to the low level, the bar signal IBB is dropped to the low level in synchronism with the falling edge whereas the true signal IBT is raised to the high level. At this time, the MOSFET Q32 is turned OFF whereas the MOSFET Q30 is turned ON. As a result, no current flows to the output terminal b at the transmission side whereas the current of 2I flows to the output terminal a.

In the operations described above, if it is in the state 0 that the current I flows, as in the circuit of FIG. 3, the current of −I flows to the terminal a whereas the current of +I flows to the terminal b when the input signal IN rises. When the input signal IN falls, the current of +I flows to the terminal a whereas the current of −I flows to the terminal b. Thus, the current outputs are in the ternary differential shape.

Figure 7:
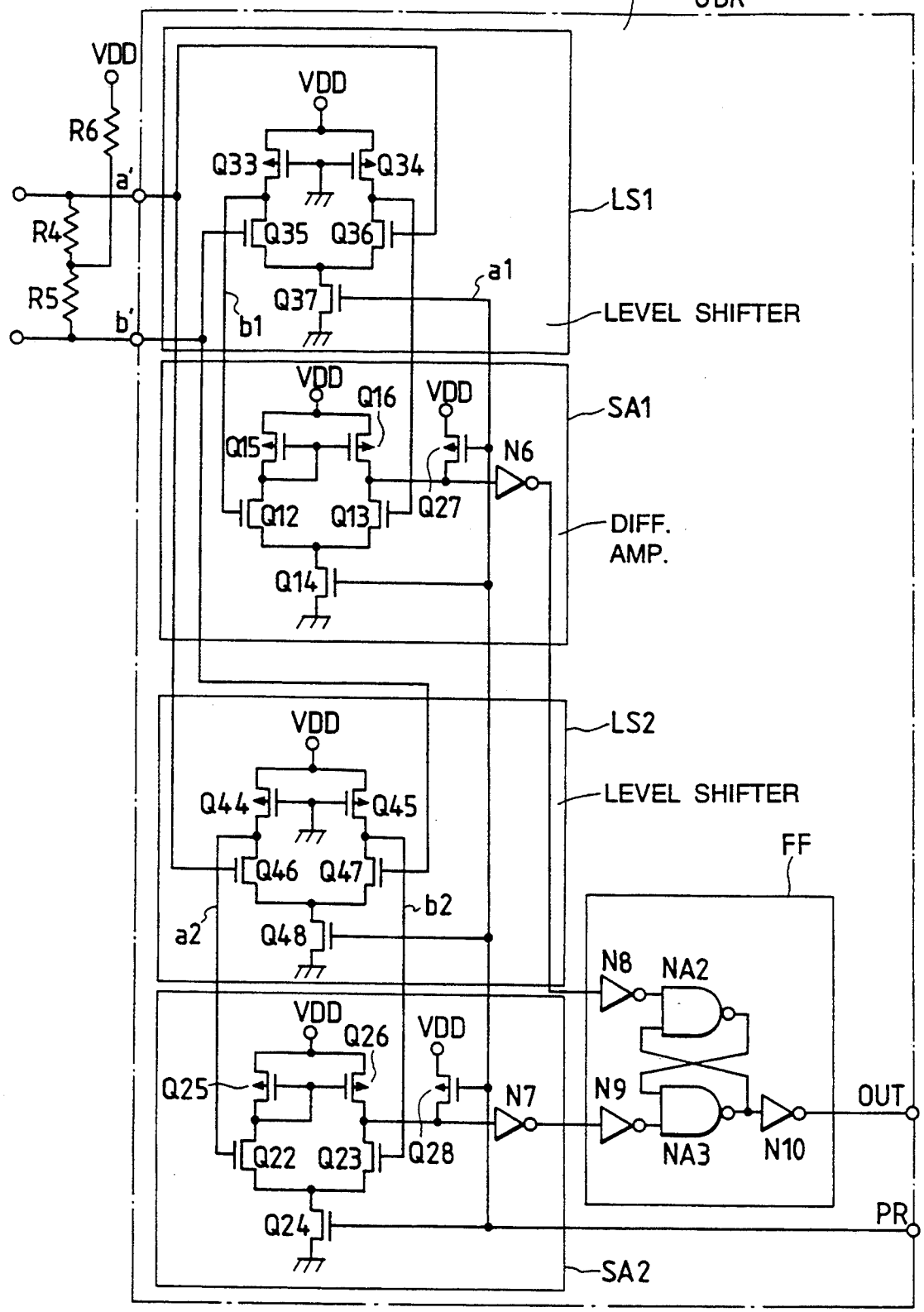
FIG. 7 is a circuit diagram showing another embodiment of the unit circuit UBR at the reception side.

FIG. 7 is a circuit diagram showing another embodiment of the unit circuit UBR at the reception side. This embodiment is made different from the embodiment of FIG. 4 in the level shifters LS1 and LS2.

The level shifters LS1 and LS2 of this embodiment are made to shift the levels of the input signals and to amplify them to some extent. As a result, the differential amplifiers SA1 and SA2 at the post step can have their sensitivities enhanced substantially.

The level shifter of the present embodiment will be described in the following by taking up the LS1 as an example. P-channel type MOSFETs Q33 and Q34 have their gates fed steadily with the ground potential so that they may act as resistance elements. The input signals a' and b' are fed to the gates of N-channel type MOSFETs Q36 and Q35. Between the sources of these MOSFETs Q35 and Q36 and the ground potential of the circuit, there is connected a MOSFET Q37 for producing a constant current. This circuit is a current-switching type differential amplifier, upon which the P-channel type MOSFETs Q33 and Q34 act as loads. These MOSFETs Q33 and Q34 have their conductances set sufficiently higher than those of the ordinary differential amplifier. This differential amplifier is substantially a DC amplifier, whose DC amplification is utilized to effect the level shifting. In other words, the input signals a' and b' biased toward the supply voltage VDD have their levels biased toward the ground potential of the circuit while being accompanied by the amplification. This bias is absolutely similar in the other level shifter LS2.

The unit circuit UBD or UBR in each of the embodiments thus far described has a simple circuit construction and a low power consumption so that it can make use of an input/output interface circuit employing the gale array, the standard cells and the like and used in the so-called "ASIC (i.e., Application Specific Integrated Circuit)". This makes it easy to design and manufacture the semiconductor integrated circuit device which has the signal transmitter and receiver packaged therein.

Figure 9:
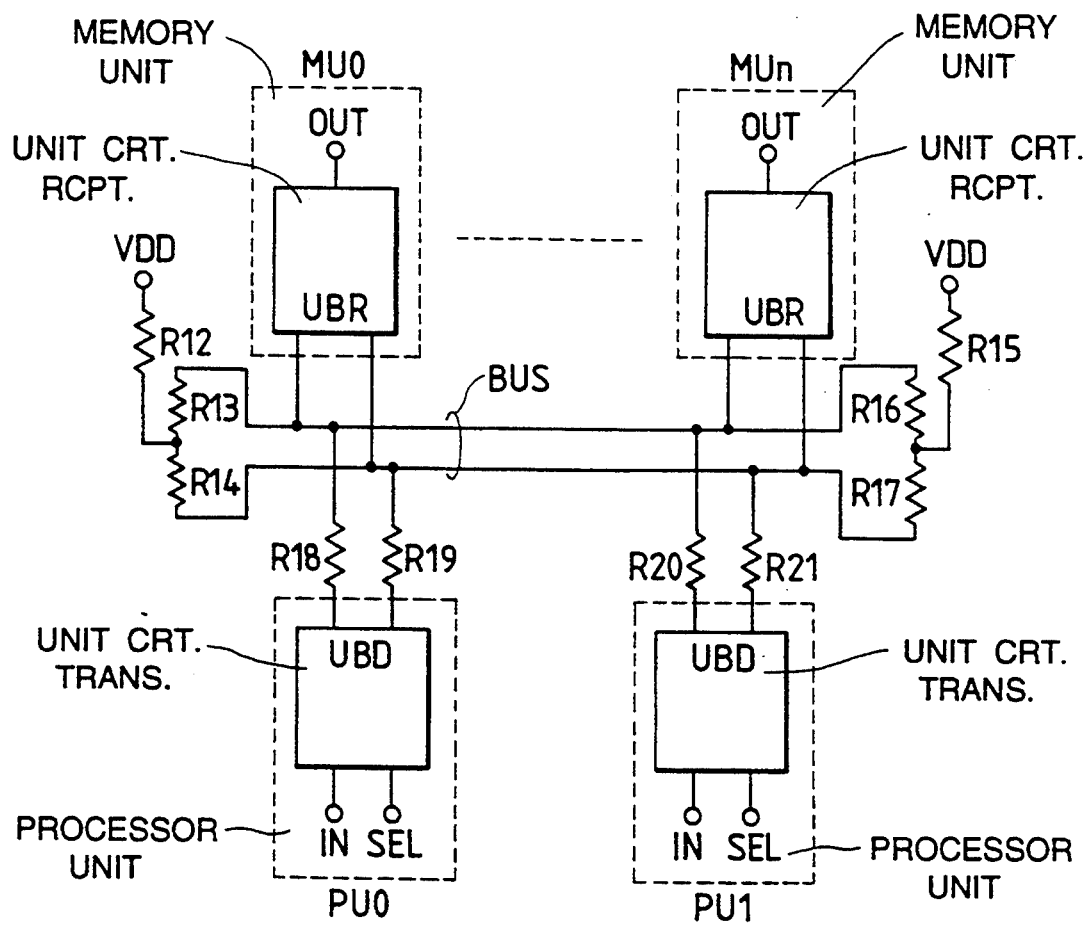
FIG. 9 is a block diagram showing another embodiment of the digital signal processor using the signal transmitting method according to the present invention.

FIG. 9 is a block diagram showing another embodiment of the digital signal processor using the signal transmitting method according to the present invention. FIG. 9 exemplifies a block diagram noting one of the bidirectional signal transmitting wirings. In the digital signal processor of this embodiment, the functional blocks for transmitting the signals are not made to correspond in the one-to-one relation of the foregoing embodiments, but the signals are selectively transmitted between the plurality of functional blocks. In short, the transmitting wirings adopt a bus constriction. The bus line feeds the signals, which are outputted timely selectively by the signal transmitting circuits of processor units PU0 and PU1, to the signal receiving circuits UBR of memory units MU0 to MUn. One of these memory units MU0 to MUn is selected to receive the signals which are transmitted through the bus line, although not especially limitative thereto.

In the digital processor of this embodiment, the signals are transferred between the processors and the memories by the bus construction as in the microcomputer having the board construction. Specifically, the processor units PU0 and PU1 and the memory units MU0 to MUn are constructed as the functional blocks to include the semiconductor integrated circuit device constituting the microprocessor and the memory and the electronic circuit package having the packaging substrate or the like packaging the semiconductor integrated circuit device. The bus line acting as the transmitting wirings is constructed to include twisted pair lines corresponding to the signal number.

In case the bus system is adopted as above, the signals are transmitted by using the common transmitting wirings in a time sharing manner. In the embodiment of FIG. 3, the MOSFETs Q3 and Q6 may be turned OFF in response to the signal SEL. In the embodiment of FIG. 6, all the MOSFETs Q29 to Q32 may be turned OFF by adding the signal SEL.

In order to adopt the bus construction, there are connected with the proper intermediate points of a pair of transmitting wirings the unit circuit UBD, which corresponds to the processor units PU0 to PU1 at the transmission side, and the unit circuit UBR which corresponds to the memory units MU0 to MUn. Since the transmitting wirings thus have no specific transmission end and reception end in the hardware, they are equipped at their individual two ends with terminal resistors R12 to R14 and R15 to R17. These terminal registers R12 to R17 are packaged in the package substrate of the units which constitute the functional blocks at the two end portions of the signal transmitting wirings in the hardware.

When the memory unit MU0 is selected to receive the signal from the processor unit PU0, its unit circuit UBR is activated by the control signal PR. As a result, the signal transmissions are carried out. Since, at this time, the transmitting wirings have their two ends equipped with the terminal resistors matching the characteristic impedance, no reflection occurs from the ends of the transmitting wirings connected with the memory unit MUn and the like, when the signals are transmitted between the processor unit PU0 and memory unit MU0. Incidentally, a driving capacity of two times is required of the signal transmitting circuit in case the terminal resistors are thus arranged at the two ends of the transmitting wirings. This makes it necessary for the transmission circuit UBD to have a higher driving for an identical signal level capacity than that of the case of signal transmissions corresponding to the one-to-one relation. With the bus construction described above, the signal receiving side may either select only one memory unit to receive the signals Dr cause all the plurality of memory units to receive an identical signal simultaneously.

Figure 10:
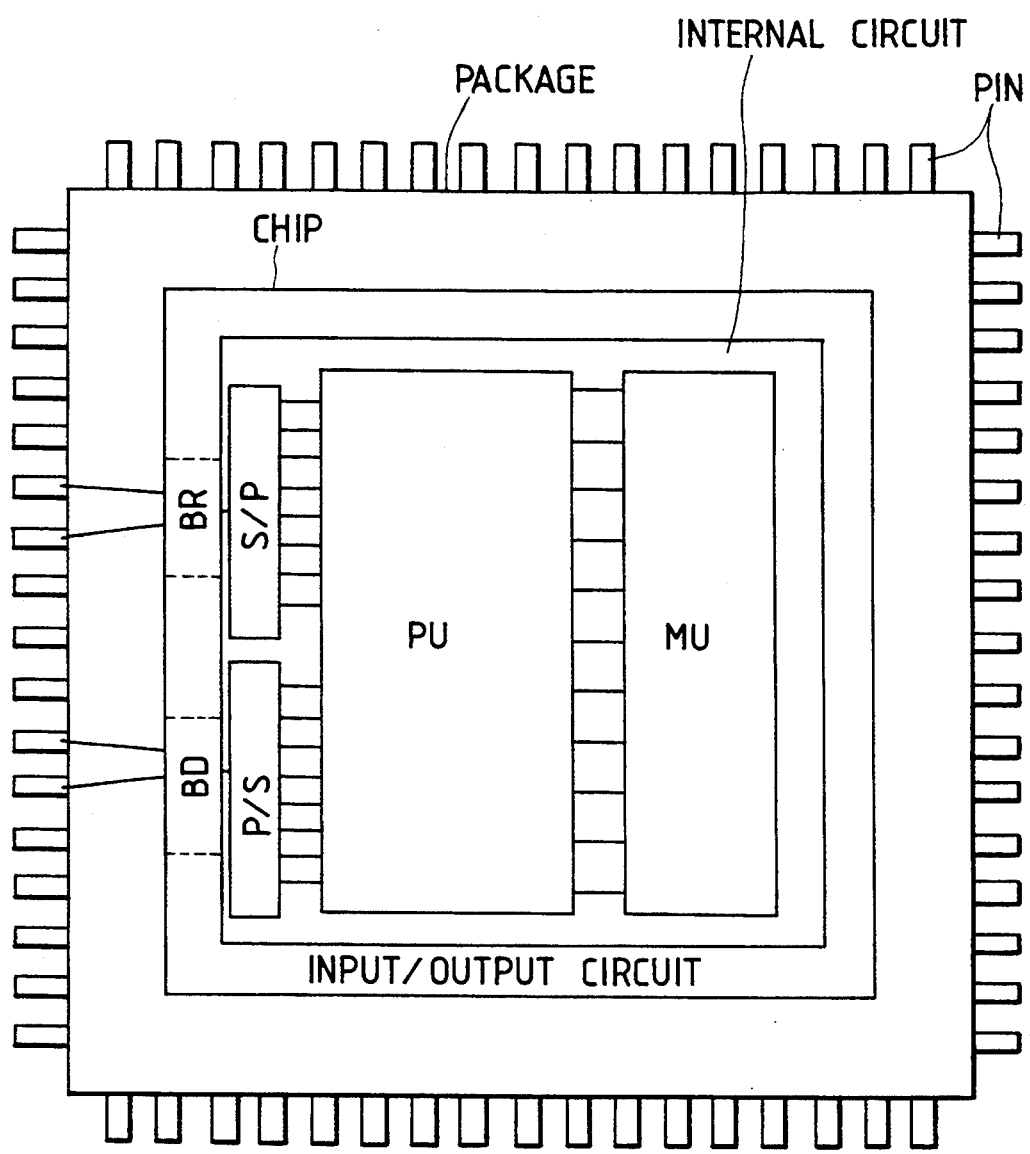
FIG. 10 is a block diagram showing one embodiment of the semiconductor integrated circuit device having the signal transmitting circuit packaged therein according to the present invention.

FIG. 10 is a block diagram showing one embodiment of the semiconductor integrated circuit device having the signal transmitting circuit packaged therein according to the present invention. FIG. 10 additionally shows a geometric construction of the semiconductor integrated circuit device.

In case of a long range transmission for signals at the TTL or ECL level as in the prior art, it is necessary to drop the transmission speed of the signals. In ceder to compensate such drop of the signal transmission speed, data of N bits are transferred in parallel to establish a transfer speed of equivalent N times. However, the semiconductor integrated circuit device has an accordingly increased terminal number. This semiconductor integrated circuit device has a tendency to have its terminal number increased the more as it is integrated the more highly with the more functions. As a result, the increase in the terminal number invites a disadvantage in the manufacturing and packaging aspects due to the increased package size.

The signal transmitting circuit according to the present invention is featured in that it can perform a long range transmission at a high speed, as described above. In the embodiment of FIG. 10, therefore, the digital circuit having the data processing processor unit PU and the memory unit MU is equipped at its signal output side with a parallel/serial converter P/S for converting and outputting unit data of a plurality of bits processed by the processor unit PU into serial data. These serial data are transformed into the NRZ signals and then sent to the signal transmitting circuit BD so that they are transmitted at a high speed, as described above. The signal transmitting method of the present invention uses the ternary differential signals, as described above, it transmits the signals by using the two terminals.

Likewise, the received signals transmitted serially from another not-shown device are fetched by the receiving circuit BR to restore and reproduce the NRZ signals. These signals are converted by a serial/parallel converter S/P into data of the unit to be processed by the processor unit PU and are fetched by the processor unit PU until they are stored in the memory unit MU, if necessary. Incidentally, the chip is arranged in its periphery with an input/output circuit. This input/output circuit is used to not only act as the serial interface but also transfer the various control signals and other input-/output data.

This construction requires as many as sixteen terminals if the data at the unit of 8 bits, for example, are transmitted and received in parallel as they are. On the contrary, the terminals can be reduced to only four if the signal transmitting circuit of the present invention is used. Thus, it is possible to reduce the size of the package and to add functions by using the idle terminals.

The signal transmitting method and circuit according to the present invention is useful in the ATM (Asynchronous Transmission Mode) for ISDN (Integrated Services Digital Network System). Specifically, this ISDN provides integrated services the data of telephones and facsimiles/personal computers, and the image data of TV telephones and TV conferences through one digital network. In order to construct this digital network, there have been progressed the researches and developments of the ATM. More specifically, the ATM as a transfer system for integrating the wide band ISDN and the narrow band ISDN has been developed to handle the media of various rates flexibly.

The ATM is enabled to realize various transmission rates by changing the number of transmissions per unit time of packets (or cells) of fixed short length. The STM (Synchronous Transmission Mode) of the prior art is multiplexed by incorporating the data to be transmitted into the time band (or slot) assigned periodically. This multiplication can be easily controlled but lacks the flexibility because the time slot has a minimum unit of 64 Kbits/sec. so that the signal transmitting speed to be set is integer times as large as the minimum unit. Irrespective of the presence or absence of the substantial data, moreover, the using efficiency is not high because a predetermined band is occupied while a communication channel is being set.

The system for occupying the transmitting wirings in accordance with the amount of data of channels without determining the time slot is exemplified by the X.25 packet. However, this X.25 packet is based on the processing of a package of variable length by a software and has a complicated processing such as a flow control so that it is limited in increasing the speed. The ATM is an ideal system for integrating the advantages of the STM and X.25 packet and seems from the user to integrate the existing different interfaces of the media into one ATM interface.

This ATM is constructed into a complicated system in which the functional blocks having the electronic circuits packaged are connected to each other. In the semiconductor integrated circuit device packaged in the electronic circuit package, the speed advances in accordance with the development of the semiconductor technology, but the relatively elongated signal transmissions between the electronic circuit packages raise a serious bottleneck. Since the signal transmitting method and circuit thus far described in connection with the foregoing embodiments can be given a high speed with the simple construction, they can be the suitable for the ATM constructed of the complicated system.

The operational effects obtained by the foregoing embodiments are as follows.

(1) At a transmission side: a pulse having a short pulse width synchronized with the rising edge and falling edge of a pulse signal to be transmitted is generated; a ternary output signal in a differential shape is produced on the basis of the pulse; and the output signal is transmitted through series resistors via a pair of transmitting wirings. At a reception side: a reception terminal is provided with terminal resistors corresponding to the characteristic impedance of the transmitting wirings; the signal having passed through one of the transmitting wirings is detected with reference to the signal having passed through the other transmitting wiring;the signal having passed through the other transmitting wiring is detected with reference to the signal having passed through the one transmitting wiring; and the original pulse signal is restored and reproduced on the basis of the detected signals. Since the signals are generated only at the rising and falling times of the pulse signal to be transmitted and are given a complementary small amplitude divided by the series resistors at the transmission side and the terminal resistors at the reception side, and since the signals containing no DC component can be transmitted, the charging and discharging phenomena of the inter-line capacities and the DC shift can be eliminated to accomplish the transmissions at a high speed in a long range.

(2) Another effect that noises can be offset by the differential amplifiers at the reception side because they are in a common mode for the transmitting wirings is obtainer by producing the signals synchronized with the rising and falling edges of the pulse signal to be transmitter and by outputting the ternary current signal having currents of two, one and no times in combination of the current signals in a differential mode to the paired transmitting wirings.

(3) Thanks to the effect (1), the long-range and high-speed signal transmitting circuit can be realized by constructing the signal transmitting side simply of the output circuit for producing the differential ternary signal in response to the signal to be transmitted and the resistance means connected in series with the output terminals of the output circuit and by constructing the signal receiving side simply of the terminal resistors matching the characteristic impedance at the terminals of the transmitting wirings and the differential amplifiers of high input impedance.

(4) The drive current can be reduced according to the reduction of the signal amplitude. As a result, the power consumption can be reduced while using a highly integrated circuit such as the CMOS circuit.

(5) Since the unit circuits at the signal transmitting and receiving sides have the simple constructions, as described above, and the low power consumption, they can utilize the input/output interface circuit to be used in the so-called "ASIC" using the gate array, the standard cells and the like. As a result, it is possible to easily design and manufacture a semiconductor integrated circuit device which has the signal transmitting circuit or signal receiving circuit packaged therein.

(6) Thanks to the effect (1), the data of a plurality of bits produced in the semiconductor integrated circuit device are converted into serial data and transmitted at the high speed so that the number of terminals can be remarkably reduced.

Although our invention has been specifically described in connection with its embodiments, it should not be limited thereto but can naturally modified in various manners without departing from the gist thereof. The output circuits mounted in the signal transmitting circuit to be constructed into the semiconductor integrated circuit device, its internal circuit and the input circuits in the signal receiving circuit should not be limited to the CMOS circuit, the N-channel MOSFETs or the P-channel MOSFETs but can be constructed in various modes of embodiment of the combination of MOSFETs and bipolar transistors or exclusively of the bipolar transistors.

The input circuit of the signal receiving circuit may be composed of not only the MOSFETs but also 3unction FETs having a high input impedance. Moreover, the specific construction of the level shifter may take a variety of modes of embodiment using diodes or MOSFETs in the diode mode.

The transmitting wirings may be exemplified by co-axial cables. In this construction, the individual coaxial cables may be equipped with terminal resistors and series resistors for reducing the levels at the signal transmitting ends. In case these coaxial cables are used, wider band signal transmissions can be achieved according to the signal transmission characteristics. Since the ternary complementary signals of small amplitude are fed by using such paired coaxial cables, the signals can be accurately received at the reception side by the simple circuit such as the differential circuit without any specific reference voltage.

The present invention can be widely applied not only to the ATM transfer system for the ISDN but also the digital signal processor constructed of the electronic circuit package having a plurality of package substrates for transferring signals.

The effects to be obtained by the representative of the present invention disclosed herein will be briefly described in the following. Specifically, at a transmission side: a pulse having a short pulse width synchronized with the rising edge and falling edge of a pulse signal to be transmitted is generated; a ternary output signal in a differential shape is produced on the basis of the pulse; and the output signal is transmitted through series resistors via a pair of transmitting wirings. At a reception side: a reception terminal is provided with terminal resistors corresponding to the characteristic impedance of the transmitting wirings; the signal having passed through one of the transmitting wirings is detected with reference to the signal having passed through the other transmitting wiring; the signal having passed through the other transmitting wiring is detected with reference to the signal having passed through the one transmitting wiring; and the original pulse signal is restored and reproduced on the basis of the detected signals. Since the signals are generated only at the rising and falling times of the pulse signal to be transmitter and are given a complementary small amplitude divided by the series resistors at the transmission side end the terminal resistors at the reception side, and since the signals containing no DC component can be transmitted, the charging and discharging phenomena of the inter-line capacities and the DC shift can be eliminated to accomplish the transmissions at a high speed in a long range.

What is claimed is:

1. A method of data transmitting in a digital signal transmitting system, said digital signal transmitting system comprising a signal transmitting circuit and a signal receiving circuit coupled to said signal transmitting circuit by first and second transmitting wirings, comprising steps of:

generating a first pulse and a second pulse inverted in polarity from said first pulse, said first and second pulses having a pulse width being shorter than that of an input signal and which is synchronized with a rising edge of said input signal in said signal transmitting circuit, said input signal being supplied from outside of said signal transmitting circuit to said signal transmitting circuit, wherein said input signal represents data to be transmitted from said signal transmitting circuit to said signal receiving circuit, and wherein said first and second pulses are generated in response to said input signal;

generating a third pulse and a fourth pulse inverted in polarity from said third pulse, said third and fourth pulses having a pulse width being shorter than that of said input signal and which is synchronized with a falling edge of said input signal in said signal transmitting circuit, wherein said third and fourth pulses are generated in response to said input signal;

producing a first ternary output signal responding to said first and third pulses and a second ternary output signal responding to said second and fourth pulses;

transmitting said first and second ternary output signals through series resistors coupled to said signal transmitting circuit from said signal transmitting circuit to said signal receiving circuit via said first and second transmitting wirings to which terminal resistors are coupled, said terminal resistors have an impedance corresponding to a characteristic impedance of said first and second transmitting wirings;

discriminating said first ternary output signal transmitted through said first transmitting wiring referring to said second ternary output signal transmitted through said second transmitting wiring in said signal receiving circuit;

discriminating said second ternary output signal referring to said first ternary output signal in said signal receiving circuit; and restoring said input signal in accordance with discriminated signals produced in said discriminating steps in said signal receiving circuit.

2. A method according to claim 1, wherein said input signal has a plurality of pulses each of which has a predetermined pulse width and each of which has a level in accordance with the data to be represented.

3. A digital signal transmitting system comprising a signal transmitting circuit, a signal receiving circuit, first and second transmitting wirings coupled between said signal transmitting circuit and said signal receiving circuit, series resistors coupled between said signal transmitting circuit and said first and second transmitting wirings and terminal resistors coupled to said first and second transmitting wirings, said signal transmitting circuit includes:

a first signal generating circuit which generates a first pulse and a second pulse inverted in polarity from said first pulse, each of said first and second pulses having a pulse width being shorter than that of input signal and which is synchronized with a rising edge of said input signal, said input signal being supplied to said first signal generating circuit, wherein said input signal represents data to be transmitted from said signal transmitting circuit to said signal receiving circuit;

a second signal generating circuit which generates a third pulse and a fourth pulse inverted in polarity from said third pulse, each of said third and fourth pulses having a pulse width being shorter than that of said input signal and which is synchronized with a falling edge of said input signal, said input signal being supplied to said second signal generating circuit,; and a driver circuit which produces a first ternary output signal in response to said first pulse and said third pulse and which produces a second ternary output signal in response to said second pulse and said fourth pulse, said signal receiving circuit includes:

a first signal discriminating circuit which discriminates said first ternary output signal transmitted through said first transmitting wiring referring to said second ternary output signal transmitted through said second transmitting wiring;

a second signal discriminating circuit which discriminates said second ternary output signal referring to said first ternary output signal; and a reproducing circuit which restores said input signal in accordance with discriminating signals produced by said first and second signal discriminating circuits.

4. A method according to claim 3 wherein said input signal has a plurality of pulses each of which has a predetermined pulse width and each of which has a level in accordance with the data to be represented.

5. A digital signal transmitting system according to claim 4, wherein said first signal generating circuit includes:

a first delay circuit which receives said input signal and which produces a first delayed signal based on said input signal; and a first logical gate circuit which receives said input signal and said first delayed input signal and which produces said first pulse and said second pulse, each of said first and second pulses having a pulse width corresponding to a delay time in response to said input signal and said first delayed input signal, wherein said second signal generating includes:

a second delay circuit which receives said input signal and which produces a second delayed input signal based on said input signal; and a second logical gate circuit which receives said input signal and said second delayed input signal and which produces said third pulse and said fourth pulse, each of said third and fourth pulses having a pulse width corresponding to a delay time in response to said input signal and said second delayed signal.

6. A digital signal transmitting system according to claim 5, wherein said driver circuit includes:

a first MOS transistor having a gate coupled to receive said first pulse and a source-drain path coupled between said first transmitting wiring and a terminal for receiving a supplied, predetermined voltage;

a second MOS transistor having a gate coupled to receive said second pulse and a source-drain path coupled between said second transmitting wiring and said terminal;

a first current circuit coupled between each of said source-drain paths of said first and second MOS transistors and said terminal;

a third MOS transistor having a gate coupled to receive said third pulse and a source-drain path coupled between said first transmitting wiring and said terminal;

a fourth MOS transistor having a gate coupled to receive said fourth pulse and a source-drain path coupled between said second transmitting wiring and said terminal;

a second current circuit coupled between each of said source-drain paths of said third and fourth MOS transistors and said terminal.

7. A digital signal transmitting system according to claim 4, wherein each of said first pulse, said second pulse, said third pulse and said fourth pulse has two levels corresponding to values 1 and 0 of binary data.

8. A digital signal transmitting system according to claim 4, wherein said discriminating signals include a first discriminating signal and a second discriminating signal, wherein said first signal discriminating circuit comprises:

a first level shift circuit which receives said first and second ternary output signals and which produces first and second shifted signals corresponding to said first and second ternary output signals, respectively, voltage levels of said first and second shifted signals being different from voltage levels of said first and second ternary output signals, respectively; and a first sensing circuit which compares said voltage levels of said first and second shifted signals and which outputs said first discriminating signal on the basis of the comparison, wherein said second signal discriminating circuit comprises:

a second level shift circuit which receives said first and second ternary output signals and which produces third and fourth shifted signals corresponding to said first and second ternary output signals,- respectively, voltage levels of said third and fourth shifted signals being different from voltage levels of said first and second ternary output signals, respectively; and a second sensing circuit which compares said voltage levels of said third and fourth shifted signals and which outputs said second discriminating signal on the basis of the comparation, wherein said voltage levels of said first and second shifted signals differ from each other in a case where said first level shift circuit receives said first and second ternary output signals having the same voltage levels as each other, and wherein said voltage levels of said third and fourth shifted signals differ from each other in a case where said second level shift circuit receives said first and second ternary output signals having the same voltage levels as each other.

9. A digital signal transmitting system according to claim 8, wherein said first level shift circuit has MOS transistors having predetermined conductance ratio which differs said voltage levels of said first shifted signal and said second shifted signal in case that said first level shift circuit receives said first and second ternary output signals having the same voltage levels each other, wherein said second level shift circuit has MOS transistors having predetermined conductance ratio which differs said voltage levels of said third shifted signal and said fourth shifted signal in case that said second level shift circuit receives said first and second ternary output signals having the same voltage levels each other, wherein said voltage levels of said first and second shifted signals are most sensitive voltage levels for said first sensing circuit, and wherein said voltage levels of said third and fourth shifted signals are most sensitive voltage levels for said second sensing circuit.

10. A digital signal transmitting system according to claim 4, wherein said signal transmitting circuit is formed on a first semiconductor substrate together with, a first processor unit, and a parallel to serial converting circuit coupled between said signal transmitting circuit and said first processor unit, said parallel to serial converting circuit receives first parallel data provided from said first processor unit and outputs first serial data converted on the basis of said first parallel data to said signal transmitting circuit; and wherein said first serial data represents said input signal, wherein said signal receiving circuit is formed on a second semiconductor substrate together with a second processor unit and a serial to parallel converting circuit coupled between said signal receiving circuit and said second processor unit, said serial to parallel converting circuit receiving second serial data corresponding to said first and second ternary output signals from said signal receiving circuit and outputting second parallel data converted on the basis of said second serial data to said second processor unit, and wherein said second serial data represents said input signal.

* * * * *